US 12,142,257 B2

United States Patent
Harazi et al.

(10) Patent No.: US 12,142,257 B2
(45) Date of Patent: Nov. 12, 2024

(54) EMOTION-BASED TEXT TO SPEECH

(71) Applicant: Snap Inc., Santa Monica, CA (US)

(72) Inventors: Liron Harazi, Elad (IL); Jacob Assa, New York, NY (US); Alan Bekker, Givaat Shmuel (IL)

(73) Assignee: SNAP INC., Santa Monica, CA (US)

( * ) Notice: Subject to any disclaimer, the term of this patent is extended or adjusted under 35 U.S.C. 154(b) by 237 days.

(21) Appl. No.: 17/667,128

(22) Filed: Feb. 8, 2022

(65) Prior Publication Data
US 2023/0252972 A1 Aug. 10, 2023

(51) Int. Cl.
G10L 13/08 (2013.01)
G06F 3/0482 (2013.01)
G10L 13/033 (2013.01)
G10L 13/047 (2013.01)
G10L 25/18 (2013.01)

(52) U.S. Cl.
CPC ............ G10L 13/08 (2013.01); G06F 3/0482 (2013.01); G10L 13/033 (2013.01); G10L 13/047 (2013.01); G10L 25/18 (2013.01)

(58) Field of Classification Search
CPC ..... G10L 13/08; G10L 13/033; G10L 13/047; G10L 25/18; G06F 3/0482
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |

(Continued)

FOREIGN PATENT DOCUMENTS

| | | |
|---|---|---|
| CA | 2879685 A1 | 9/2013 |
| CN | 107851319 A | 3/2018 |

(Continued)

OTHER PUBLICATIONS

Tao Li et al., "Cross-speaker emotion disentangling and transfer for end-to-end speech synthesis", Aug. 2015, Journal of Class Files vol. 14 No. 8, p. 1-12.*

(Continued)

*Primary Examiner* — Fan S Tsang
*Assistant Examiner* — David Siegel
(74) *Attorney, Agent, or Firm* — SCHWEGMAN LUNDBERG & WOESSNER, P.A.

(57) ABSTRACT

Systems and methods are provided for providing emotion-based text to speech. The systems and methods perform operations comprising accessing a text string; storing a plurality of embeddings associated with a plurality of speakers, a first embedding for a first speaker being associated with a first emotion and a second embedding for a second speaker of the plurality of speakers being associated with a second emotion; selecting the first speaker to speak one or more words of the text string; determining that the one or more words are associated with the second emotion; generating, based on the first embedding and the second embedding, a third embedding for the first speaker associated with the second emotion; and applying the third embedding and the text string to a vocoder to generate an audio stream comprising the one or more words being spoken by the first speaker with the second emotion.

20 Claims, 10 Drawing Sheets

(56) References Cited

U.S. PATENT DOCUMENTS

| | | | |
|---|---|---|---|
| 6,023,270 A | 2/2000 | Brush, II et al. | |
| RE36,919 E | 10/2000 | Park | |
| RE37,052 E | 2/2001 | Park | |
| 6,223,165 B1 | 4/2001 | Lauffer | |
| 6,650,793 B1 | 11/2003 | Lund et al. | |
| 6,772,195 B1 | 8/2004 | Hatlelid et al. | |
| 6,804,417 B1 | 10/2004 | Lund et al. | |
| 6,842,779 B1 | 1/2005 | Nishizawa | |
| 7,342,587 B2 | 3/2008 | Danzig et al. | |
| 7,451,079 B2 | 11/2008 | Oudeyer | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,886,012 B2 | 2/2011 | Bedi et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| RE43,993 E | 2/2013 | Park | |
| 8,384,719 B2 | 2/2013 | Reville et al. | |
| RE44,054 E | 3/2013 | Kim | |
| RE44,068 E | 3/2013 | Park | |
| RE44,106 E | 3/2013 | Park | |
| 8,396,708 B2 | 3/2013 | Park et al. | |
| RE44,121 E | 4/2013 | Park | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,117,446 B2 * | 8/2015 | Bao | G10L 13/02 |
| 9,241,184 B2 | 1/2016 | Weerasinghe | |
| 9,256,860 B2 | 2/2016 | Herger et al. | |
| 9,269,346 B2 * | 2/2016 | Conkie | G10L 13/00 |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,336,782 B1 * | 5/2016 | Patel | G10L 13/04 |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,532,364 B2 | 12/2016 | Fujito | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,767,789 B2 | 9/2017 | Radebaugh | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,074,381 B1 | 9/2018 | Cowburn | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,158,589 B2 | 12/2018 | Collet et al. | |
| 10,204,137 B2 | 2/2019 | Shim et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,348,662 B2 | 7/2019 | Baldwin et al. | |
| 10,362,219 B2 | 7/2019 | Wilson et al. | |
| 10,432,559 B2 | 10/2019 | Baldwin et al. | |
| 10,475,225 B2 | 11/2019 | Park et al. | |
| 10,496,875 B1 | 12/2019 | Chang | |
| 10,496,947 B1 | 12/2019 | Shaburov et al. | |
| 10,504,266 B2 | 12/2019 | Blattner et al. | |
| 10,555,138 B1 | 2/2020 | Wu et al. | |
| 10,573,048 B2 | 2/2020 | Ni et al. | |
| 10,599,917 B1 | 3/2020 | Shaburov et al. | |
| 10,623,666 B2 | 4/2020 | Charlton et al. | |
| 10,643,104 B1 | 5/2020 | Xue et al. | |
| 10,656,797 B1 | 5/2020 | Alvi et al. | |
| 10,657,695 B2 | 5/2020 | Chand et al. | |
| 10,657,701 B2 | 5/2020 | Osman et al. | |
| 10,679,428 B1 | 6/2020 | Chen et al. | |
| 10,762,174 B2 | 9/2020 | Denton et al. | |
| 10,805,248 B2 | 10/2020 | Luo et al. | |
| 10,824,654 B2 | 11/2020 | Chang et al. | |
| 10,872,451 B2 | 12/2020 | Sheth et al. | |
| 10,880,246 B2 | 12/2020 | Baldwin et al. | |
| 10,895,964 B1 | 1/2021 | Grantham et al. | |
| 10,896,534 B1 | 1/2021 | Smith et al. | |
| 10,915,924 B1 | 2/2021 | Soloff | |
| 10,933,311 B2 | 3/2021 | Brody et al. | |
| 10,936,858 B1 | 3/2021 | Chang | |
| 10,938,758 B2 | 3/2021 | Allen et al. | |
| 10,964,082 B2 | 3/2021 | Amitay et al. | |
| 10,972,806 B1 | 4/2021 | Brody et al. | |
| 10,979,752 B1 | 4/2021 | Brody et al. | |
| 10,984,575 B2 | 4/2021 | Assouline et al. | |
| 10,992,619 B2 | 4/2021 | Antmen et al. | |
| 11,010,022 B2 | 5/2021 | Alvi et al. | |
| 11,017,233 B2 | 5/2021 | Charlton et al. | |
| 11,024,101 B1 | 6/2021 | Chepizhenko et al. | |
| 11,030,789 B2 | 6/2021 | Chand et al. | |
| 11,036,781 B1 | 6/2021 | Baril et al. | |
| 11,063,891 B2 | 7/2021 | Voss | |
| 11,068,141 B1 | 7/2021 | Barton et al. | |
| 11,069,103 B1 | 7/2021 | Blackstock et al. | |
| 11,080,917 B2 | 8/2021 | Monroy-hernández et al. | |
| 11,099,643 B1 | 8/2021 | Miller et al. | |
| 11,112,945 B1 | 9/2021 | Al Majid et al. | |

(56) References Cited

U.S. PATENT DOCUMENTS

| | | | |
|---|---|---|---|
| 11,128,586 B2 | 9/2021 | Al Majid et al. |
| 11,157,557 B2 | 10/2021 | Mashrabov et al. |
| 11,164,353 B2 | 11/2021 | Luo et al. |
| 11,165,734 B1 | 11/2021 | Desserrey et al. |
| 11,169,675 B1 | 11/2021 | Anvaripour et al. |
| 11,176,723 B2 | 11/2021 | Krishnan Gorumkonda et al. |
| 11,188,190 B2 | 11/2021 | Blackstock et al. |
| 11,189,070 B2 | 11/2021 | Jahangiri et al. |
| 11,189,104 B2 | 11/2021 | Goodrich et al. |
| 11,195,341 B1 | 12/2021 | Canberk et al. |
| 11,199,957 B1 | 12/2021 | Alvi et al. |
| 11,210,467 B1 | 12/2021 | Carvalho et al. |
| 11,210,850 B2 | 12/2021 | Goodrich et al. |
| 11,212,383 B2 | 12/2021 | Voss et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0024393 A1* | 1/2009 | Kaneyasu ............ G10L 13/033 704/260 |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0238658 A1 | 9/2013 | Burris |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0089343 A1 | 3/2014 | Burris et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0356101 A1 | 12/2015 | Cohen et al. |
| 2015/0356102 A1 | 12/2015 | Cohen et al. |
| 2016/0078859 A1* | 3/2016 | Luan ................ G10L 13/027 704/260 |
| 2016/0134840 A1 | 5/2016 | Mcculloch |
| 2016/0234149 A1 | 8/2016 | Tsuda et al. |
| 2016/0329043 A1* | 11/2016 | Kim ................ G10L 13/10 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0386941 A1 | 12/2019 | Baldwin et al. |
| 2020/0234480 A1 | 7/2020 | Volkov et al. |
| 2020/0241575 A1 | 7/2020 | Meisenholder et al. |
| 2020/0306637 A1 | 10/2020 | Baldwin et al. |
| 2020/0336454 A1 | 10/2020 | Grantham et al. |
| 2020/0351353 A1 | 11/2020 | Al Majid et al. |
| 2020/0356760 A1 | 11/2020 | Li et al. |
| 2020/0358731 A1 | 11/2020 | Boyd et al. |
| 2020/0372127 A1 | 11/2020 | Denton et al. |
| 2020/0393915 A1 | 12/2020 | Brendel et al. |
| 2020/0410575 A1 | 12/2020 | Grantham et al. |
| 2020/0412864 A1 | 12/2020 | Al Majid et al. |
| 2020/0412975 A1 | 12/2020 | Al Majid et al. |
| 2021/0065448 A1 | 3/2021 | Goodrich et al. |
| 2021/0065464 A1 | 3/2021 | Goodrich et al. |
| 2021/0067756 A1 | 3/2021 | Goodrich et al. |
| 2021/0067836 A1 | 3/2021 | Hornsby et al. |
| 2021/0074047 A1 | 3/2021 | Sheth et al. |
| 2021/0076173 A1 | 3/2021 | Monroy-Hernandez et al. |
| 2021/0081088 A1 | 3/2021 | Voss |
| 2021/0089179 A1 | 3/2021 | Grantham et al. |
| 2021/0097245 A1 | 4/2021 | Monroy-Hernández |
| 2021/0097743 A1 | 4/2021 | Krishnan Gorumkonda et al. |
| 2021/0104087 A1 | 4/2021 | Smith et al. |
| 2021/0165559 A1 | 6/2021 | Voss et al. |
| 2021/0165998 A1 | 6/2021 | Cao et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0200390 A1 | 7/2021 | Luo et al. |
| 2021/0201392 A1 | 7/2021 | Aghdaii et al. |
| 2021/0203627 A1 | 7/2021 | Luo et al. |
| 2021/0203628 A1 | 7/2021 | Luo et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243487 A1 | 8/2021 | Kotsopoulos et al. |
| 2021/0243503 A1 | 8/2021 | Kotsopoulos et al. |
| 2021/0264668 A1 | 8/2021 | Goodrich et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303077 A1 | 9/2021 | Anvaripour et al. |
| 2021/0303110 A1 | 9/2021 | Giacalone et al. |
| 2021/0303114 A1 | 9/2021 | Apanovych et al. |
| 2021/0303860 A1 | 9/2021 | Anvaripour et al. |
| 2021/0304429 A1 | 9/2021 | Cowburn et al. |
| 2021/0304449 A1 | 9/2021 | Mourkogiannis |
| 2021/0304451 A1 | 9/2021 | Fortier et al. |
| 2021/0304505 A1 | 9/2021 | Anvaripour et al. |
| 2021/0304506 A1 | 9/2021 | Mourkogiannis et al. |
| 2021/0304754 A1 | 9/2021 | Fortier et al. |
| 2021/0306290 A1 | 9/2021 | Voss |
| 2021/0306451 A1 | 9/2021 | Heikkinen et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |

(56) References Cited

U.S. PATENT DOCUMENTS

| | | |
|---|---|---|
| 2021/0312682 A1 | 10/2021 | Krishnan Gorumkonda et al. |
| 2021/0312690 A1 | 10/2021 | Krishnan Gorumkonda et al. |
| 2021/0319612 A1 | 10/2021 | Monroy-Hernandez et al. |
| 2021/0319625 A1 | 10/2021 | Goodrich et al. |
| 2021/0334993 A1 | 10/2021 | Woodford |
| 2021/0335004 A1 | 10/2021 | Zohar et al. |
| 2021/0335350 A1 | 10/2021 | Ribas Machado Das Neves et al. |
| 2021/0352029 A1 | 11/2021 | Lo et al. |
| 2021/0357075 A1 | 11/2021 | Nayar et al. |
| 2021/0360056 A1 | 11/2021 | Baron et al. |
| 2021/0374839 A1 | 12/2021 | Luo et al. |
| 2021/0382585 A1 | 12/2021 | Collins et al. |
| 2021/0382587 A1 | 12/2021 | Heikkinen et al. |
| 2021/0382616 A1 | 12/2021 | Gale et al. |
| 2021/0383373 A1 | 12/2021 | Firinberg et al. |
| 2021/0385180 A1 | 12/2021 | Al Majid et al. |
| 2021/0387090 A1 | 12/2021 | Firinberg et al. |
| 2021/0387097 A1 | 12/2021 | Desserrey et al. |
| 2021/0387099 A1 | 12/2021 | Desserrey et al. |
| 2021/0389851 A1 | 12/2021 | Al Majid et al. |
| 2021/0389852 A1 | 12/2021 | Desserrey et al. |
| 2021/0389866 A1 | 12/2021 | Al Majid et al. |
| 2021/0390118 A1 | 12/2021 | Gorkin et al. |
| 2021/0390745 A1 | 12/2021 | Rykhliuk et al. |
| 2021/0390784 A1 | 12/2021 | Smith et al. |
| 2021/0392096 A1 | 12/2021 | Desserrey et al. |
| 2021/0392098 A1 | 12/2021 | Gorkin et al. |
| 2021/0392459 A1 | 12/2021 | Gorkin et al. |
| 2021/0392460 A1 | 12/2021 | Gorkin et al. |
| 2021/0404831 A1 | 12/2021 | Drummond et al. |
| 2021/0405831 A1 | 12/2021 | Mourkogiannis et al. |
| 2021/0405832 A1 | 12/2021 | Brown et al. |
| 2021/0406447 A1 | 12/2021 | Hermann et al. |
| 2021/0406543 A1 | 12/2021 | Drummond et al. |
| 2021/0406965 A1 | 12/2021 | Anvaripour et al. |
| 2021/0407163 A1 | 12/2021 | Chai et al. |
| 2021/0407506 A1 | 12/2021 | Drummond et al. |
| 2021/0407533 A1 | 12/2021 | Cowburn et al. |
| 2021/0409356 A1 | 12/2021 | Luo et al. |
| 2021/0409357 A1 | 12/2021 | Brody et al. |
| 2021/0409502 A1 | 12/2021 | Chepizhenko et al. |
| 2021/0409517 A1 | 12/2021 | Luo et al. |
| 2021/0409535 A1 | 12/2021 | Mourkogiannis et al. |
| 2021/0409610 A1 | 12/2021 | Mandia et al. |
| 2021/0409612 A1 | 12/2021 | Mandia et al. |
| 2021/0409614 A1 | 12/2021 | Luo et al. |
| 2021/0409616 A1 | 12/2021 | Chan et al. |
| 2022/0012929 A1 | 1/2022 | Blackstock et al. |

FOREIGN PATENT DOCUMENTS

| | | |
|---|---|---|
| CN | 108351988 A | 7/2018 |
| CN | 108885639 A | 11/2018 |
| CN | 108885795 A | 11/2018 |
| CN | 109791635 A | 5/2019 |
| CN | 109844761 A | 6/2019 |
| CN | 109863532 A | 6/2019 |
| CN | 109964236 A | 7/2019 |
| CN | 109997129 | 7/2019 |
| CN | 110168478 A | 8/2019 |
| CN | 110192395 | 8/2019 |
| CN | 110199245 A | 9/2019 |
| CN | 110291547 A | 9/2019 |
| CN | 110383344 A | 10/2019 |
| CN | 110462616 A | 11/2019 |
| CN | 110495166 A | 11/2019 |
| CN | 107111434 B | 11/2020 |
| EP | 2184092 A2 | 5/2010 |
| EP | 2634714 | 9/2013 |
| JP | 2001230801 A | 8/2001 |
| JP | 5497931 B2 | 3/2014 |
| KR | 101445263 B1 | 9/2014 |
| KR | 20180132124 A | 12/2018 |
| KR | 20190088503 A | 7/2019 |
| KR | 20200017000 A | 2/2020 |
| KR | 20200071782 A | 6/2020 |
| KR | 20210052575 A | 5/2021 |
| KR | 20210052584 A | 5/2021 |
| NO | 2021202191 | 10/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2020073944 A1 * | 4/2020 | ............ G06F 40/30 |
| WO | 2020197766 | 10/2020 |
| WO | 2020264550 | 12/2020 |
| WO | 2021042134 | 3/2021 |
| WO | 2021067988 | 4/2021 |
| WO | 2021119662 | 6/2021 |
| WO | 2021138630 | 7/2021 |
| WO | WO-2021133960 A1 | 7/2021 |
| WO | 2021154998 | 8/2021 |
| WO | 2021155249 | 8/2021 |
| WO | 2021194755 | 9/2021 |
| WO | 2021194855 | 9/2021 |
| WO | 2021194856 | 9/2021 |
| WO | 2021195404 | 9/2021 |
| WO | 2021202241 | 10/2021 |
| WO | 2021203118 | 10/2021 |
| WO | 2021203119 | 10/2021 |
| WO | 2021211851 | 10/2021 |
| WO | 2021216999 | 10/2021 |
| WO | 2021222198 | 11/2021 |
| WO | 2021222225 | 11/2021 |
| WO | 2021236287 | 11/2021 |
| WO | 2021237088 | 11/2021 |
| WO | 2021242686 | 12/2021 |
| WO | 2021242771 | 12/2021 |
| WO | 2021252202 | 12/2021 |
| WO | 2021252218 | 12/2021 |
| WO | 2021252232 | 12/2021 |
| WO | 2021252233 | 12/2021 |
| WO | 2021252383 | 12/2021 |
| WO | 2021252386 | 12/2021 |
| WO | 2021252501 | 12/2021 |
| WO | 2021252662 | 12/2021 |
| WO | 2021252759 | 12/2021 |
| WO | 2021252763 | 12/2021 |
| WO | 2021253048 | 12/2021 |
| WO | 2021257280 | 12/2021 |
| WO | 2021257401 | 12/2021 |
| WO | 2021257450 | 12/2021 |
| WO | 2021257455 | 12/2021 |
| WO | 2021257616 | 12/2021 |
| WO | 2021257619 | 12/2021 |
| WO | 2021263208 | 12/2021 |
| WO | 2021263210 | 12/2021 |
| WO | WO-2023154323 A1 | 8/2023 |

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

(56) References Cited

OTHER PUBLICATIONS

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"International Application Serial No. PCT/US2023/012594, International Search Report mailed Jun. 12, 2023", 5 pgs.
"International Application Serial No. PCT/US2023/012594, Invitation to Pay Additional Fees mailed Apr. 18, 2023", 10 pgs.
"International Application Serial No. PCT/US2023/012594, Written Opinion mailed Jun. 12, 2023", 10 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Fatima, Syeda Maryam, et al., "Neural Style Transfer Based Voice Mimicking for Personalized Audio Stories", AI4TV '20, Session 1: Video Analytics and Storytelling, (Oct. 12, 2020), 11-16.
Li, Tao, et al., "Controllable cross-speaker emotion transfer for end-to-end speech synthesis", Journal of Latex Class Files, vol. 14, No. 8, (Aug. 2015), 12 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

* cited by examiner

EMOTION-BASED TEXT TO SPEECH

TECHNICAL FIELD

The present disclosure generally relates to the technical field of social networks. In particular, the present examples are generally directed to performing text-to-speech (TTS).

BACKGROUND

As the popularity of social networking grows, social networks are expanding their capabilities. To improve ease of use, social networks are integrating more and more functions such that a user may accomplish many or even most of their computer-based tasks within the social network itself some social networks allow users to generate videos that include text spoken by a given person.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
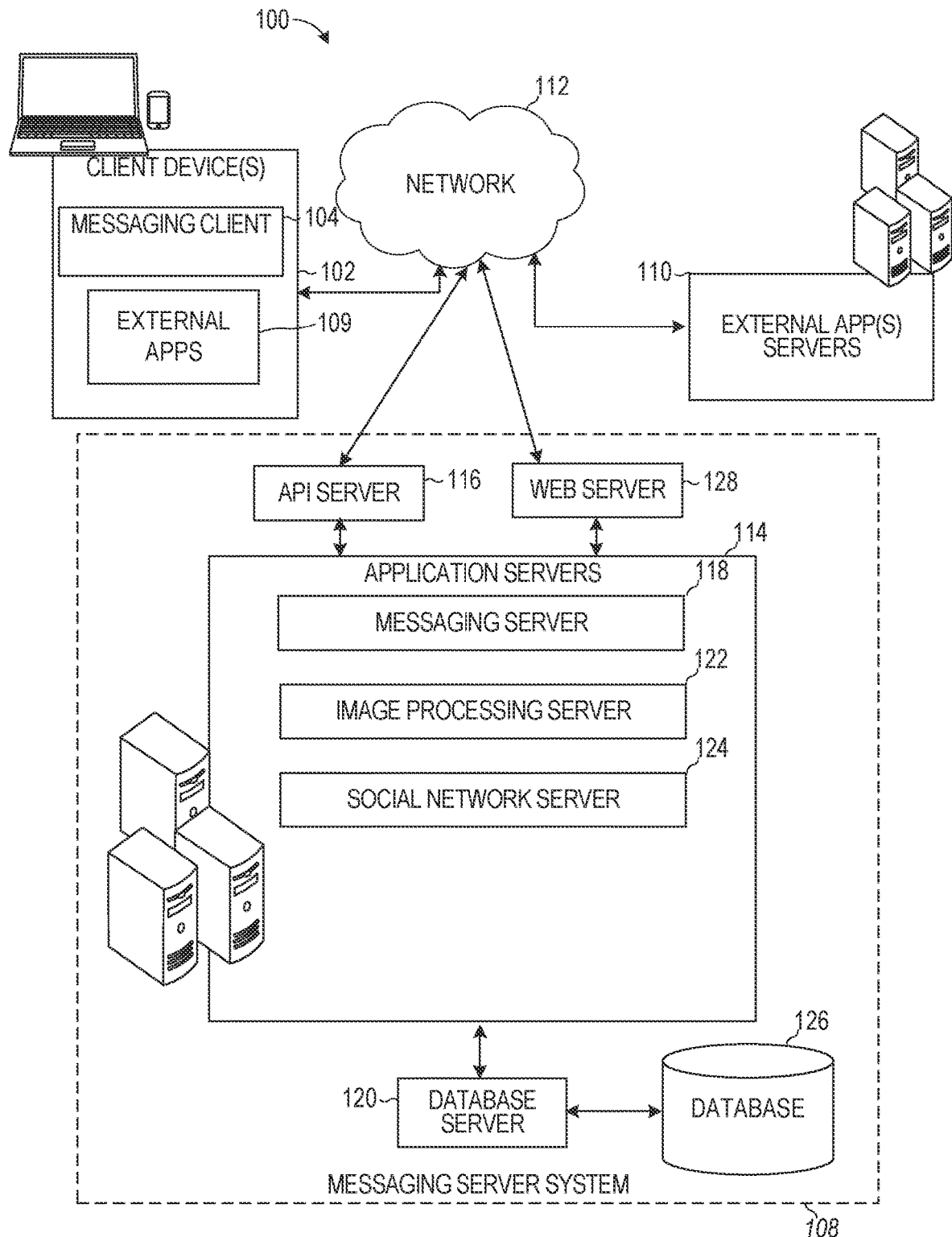
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Certain social networking systems allow users to generate videos and embed text or voice into the videos. In some cases, the users would like to get synthesized voice spoken during the video playback, also in some cases the users can request that the text be converted to speech and spoken during playback of the videos. To do so, the systems accept the user text, normalize the text and input the normalized text into an acoustic generator to generate the speech of the text by a given (user selected) speaker. Typically, this is done in the form of mapping the selected speaker to a corresponding set of embedding vectors that encapsulate the speaker's voice characteristics. The embedding together with the required text are used as inputs to an acoustic generator (e.g., a neural network) that generates the speech in the form of MEL spectrogram. The Mel spectrogram is being converted into an audio stream, using a vocoder (e.g., a neural network) that may be influenced by the embedding vectors as well. One of the main challenges of these systems is providing a more human-like speech output that includes emotions. These systems can generate audio that speaks text in a neutral emotion which results in an cold, impassive and discouraging experience. In order to provide more realistic experiences, the users have to record themselves speaking the text and incorporate the spoken speech into the video. However, such approaches are incredibly time consuming, inefficient, and even less clear which has unfavorable effect the resulting experience, detracts from the overall use of the system and wastes system resources.

The disclosed techniques improve the efficiency of using the electronic device by providing a text to speech (TTS) system that dynamically generates an audio file in which a speaker's voice is used to virtually speak words given as text using one or more emotions derived from the input. According to the disclosed techniques, a text is accessed or received. The disclosed techniques store a plurality of embeddings associated with a plurality of speakers. A first embedding for a first speaker is associated with a first emotion and a second embedding for a second speaker of the plurality of speakers is associated with a second emotion. The disclosed techniques select the first speaker to speak one or more words of the text, such as in response to input from a user that selects the first speaker. The disclosed techniques determine that the one or more words of the text string are associated with the second emotion. The disclosed techniques can determine that there does not exist an embedding for the first speaker and the second emotion. In response, the disclosed techniques generate, based on the first embedding and the second embedding, a third embedding for the first speaker associated with the second emotion and apply the third embedding and the text string to an acoustic generator and vocoder to generate an audio stream that includes the one or more words being spoken by the first speaker with the second emotion.

This significantly improves the overall ability for the social network system to perform automated speech generation and enhances the realism associated with such generated speech. In this way, the disclosed techniques provide a much more intuitive, robust, and engaging experience and avoid having users record individual audio files for any given text string. This reduces the amount of resources needed to perform routine social networking tasks and operations.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications such as external apps 109 using Applications Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging client 104 can receive a text string, such as from an augmented reality experience and/or a user input that types in words of the text string to associate with a video or to transmit as a message to another user. The messaging client 104 can also receive a selection of a speaker (a specified speaker) or can randomly or pseudo-randomly select the speaker from a list of speakers. The messaging client 104 can generate audio that includes one or more words of the text string virtually spoken by the specified speaker with a specified emotion. The messaging client 104 can generate the audio by splitting embeddings of various speakers into two components that include voice and style components. The messaging client 104 can determine that the specified emotion is not available for the specified speaker. In response, the messaging client 104 can identify one or more other speakers for which the specified emotion is available. The messaging client 104 can generalize the style components of the identified speakers corresponding to the specified emotion and can combine the generalized style components with the voice component of the specified speaker. This results in a new embedding for the specified speaker that is associated with the specified emotion. This new embedding can be used to generate the audio in which the specified speaker virtually speaks the one or more words of the text string with the specified emotion. In some examples, the new embedding—can be generated using a machine learning technique (e.g., a neural network).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a client device 102) and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., watermarks, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
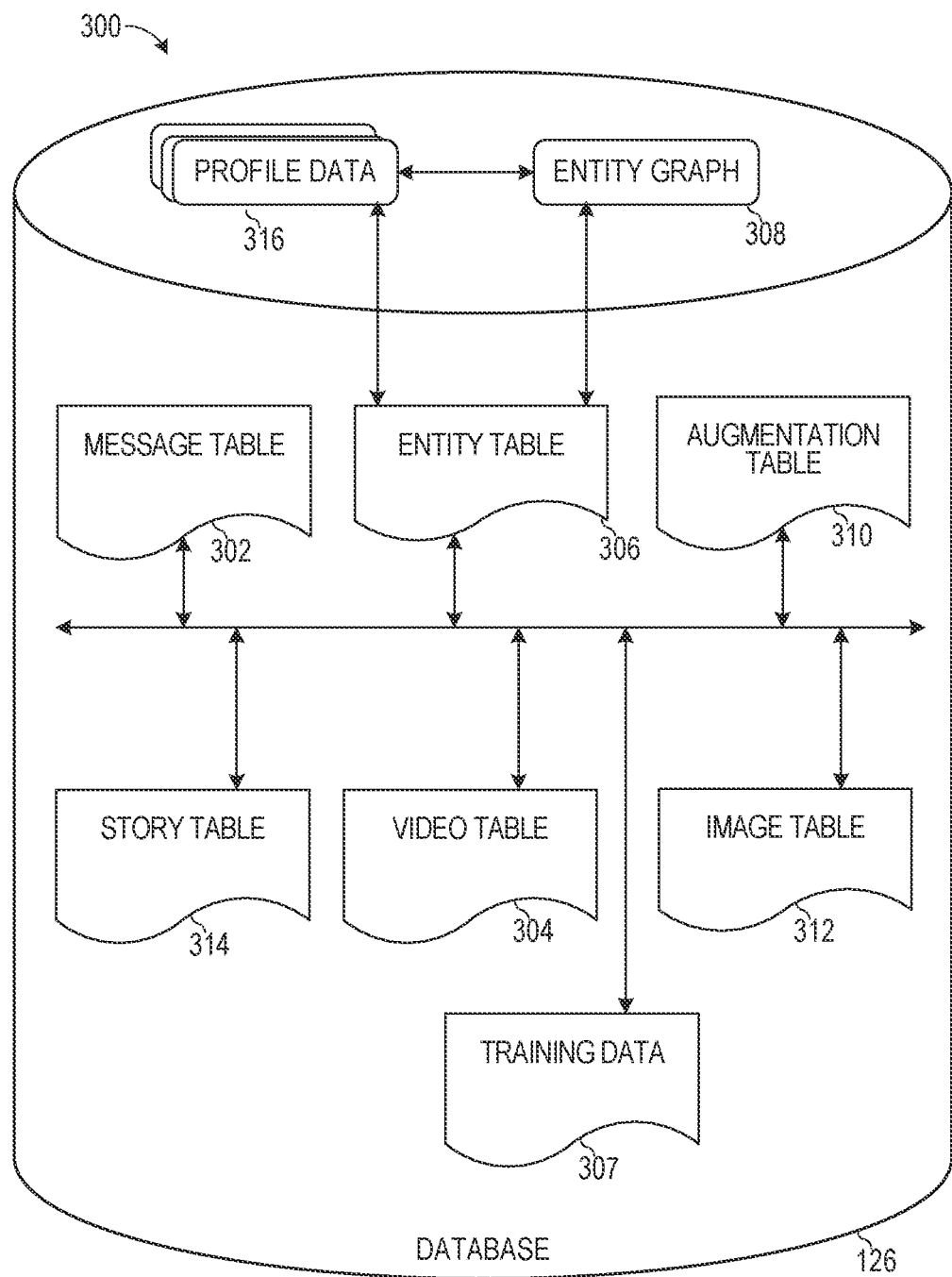
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In some examples, the messaging client 104 can present an augmented reality experience that can provide speech or conversation-based interactions. For example, the messaging client 104 can capture an image or video of a user (or a 2D or 3D environment), such as using a front-facing camera of the client device 102. The messaging client 104 can overlay or display on the image or video that depicts the user one or more augmented reality graphical elements that make up the augmented reality experience. As an example, the messaging client 104 can display augmented reality fashion items, such as makeup, clothing, jewelry, hats or glasses. As another example, the messaging client 104 can present an avatar as the augmented reality graphical element that represents the user. As another example, the messaging client 104 can capture an image or video of an environment that depicts a vehicle. In such cases, the messaging client 104 can receive speech interaction (input) from the user requesting to change a color of the vehicle. In response, the messaging client 104 can display the vehicle with an augmented reality color requested by the speech interaction.

System Architecture

Figure 2:
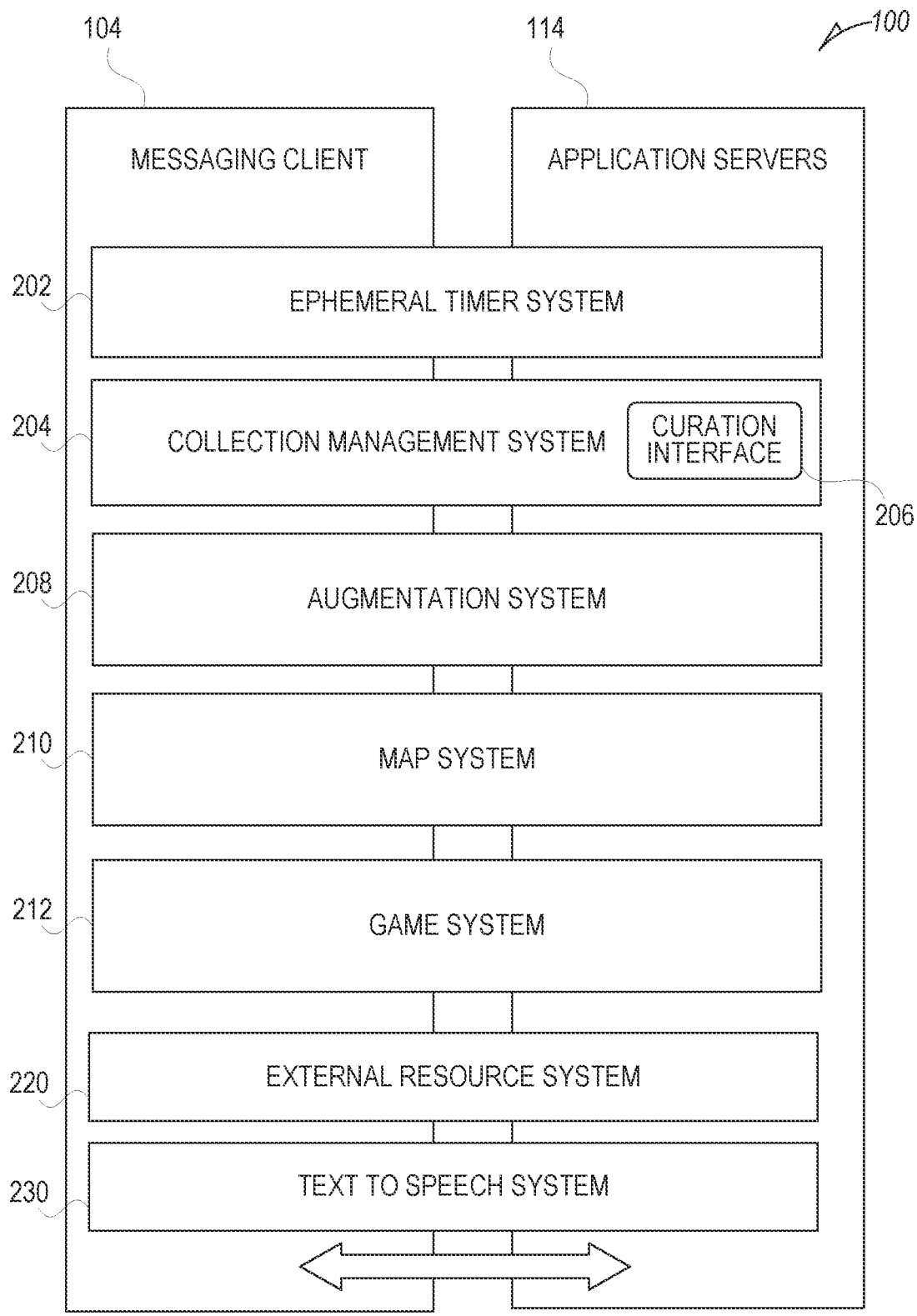
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a text to speech system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking-based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items). Based on an intent classification of the speech input and accurate transcription of the speech input, the messaging client 104 can perform game-based functions.

The external resource system 220 provides an interface for the messaging client 104 to communicate with external app(s) servers 110 to launch or access external resources. Each external resource (apps) server 110 hosts, for example, a markup language (e.g., HTML5)-based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used. Based on an intent classification of the speech input and accurate transcription of the speech input, the messaging client 104 can perform external resource-based functions.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The text to speech system 230 generates an audio stream that includes one or more words spoken by a specified speaker with a given emotion. As an example, the text to speech system 230 can receive a text string, such as from an augmented reality experience and/or a user input that types in words of the text string to associate with a video or to transmit as a message to another user. The text to speech system 230 can also receive a selection of a speaker (a specified speaker) or can randomly or pseudo-randomly select the speaker from a list of speakers. The text to speech system 230 can apply a machine learning technique to generate audio that includes one or more words of the text string spoken by the specified speaker with a specified emotion.

In some examples, the text to speech system 230 can generate the audio by splitting embeddings of various speakers into two components that include voice and style components. The text to speech system 230 can determine that the specified emotion is not available for the specified speaker. In response, the text to speech system 230 can identify one or more other speakers for which the specified emotion is available. The text to speech system 230 can generalize the style components of the identified speakers corresponding to the specified emotion and can combine the generalized style components with the voice component of the specified speaker. This results in a new embedding for the specified speaker that is associated with the specified emotion. This new embedding can be used to generate the audio in which the specified speaker speaks the one or more words of the text string with the specified emotion. In some examples, the new embedding and the generalized embedding can be generated using a machine learning technique (e.g., a neural network).

In some examples, the text to speech system 230 can apply a machine learning technique to the text string to compute a level of an emotion associated with the one or more words of the text string. The level of the emotion can then be used to scale the amount of style component (associated with the emotion) that is used in a given embedding for the specified speaker. The text to speech system 230 can mix or combine different style components of the same or different speakers by applying different coefficients to the style components based on the level of the emotion that is determined or computed for the one or more words of the text string. For example, the text to speech system 230 can scale a style component (associated with a first emotion, such as neutral emotion) by a first coefficient or scaling factor towards a second style component (associated with a second emotion, such as a happy emotion). This scaled style component is combined with the voice component for the embedding of the specified speaker and is used to generate an audio stream in which the specified speaker speaks the one or more words with the computed level of emotion.

Figure 5:
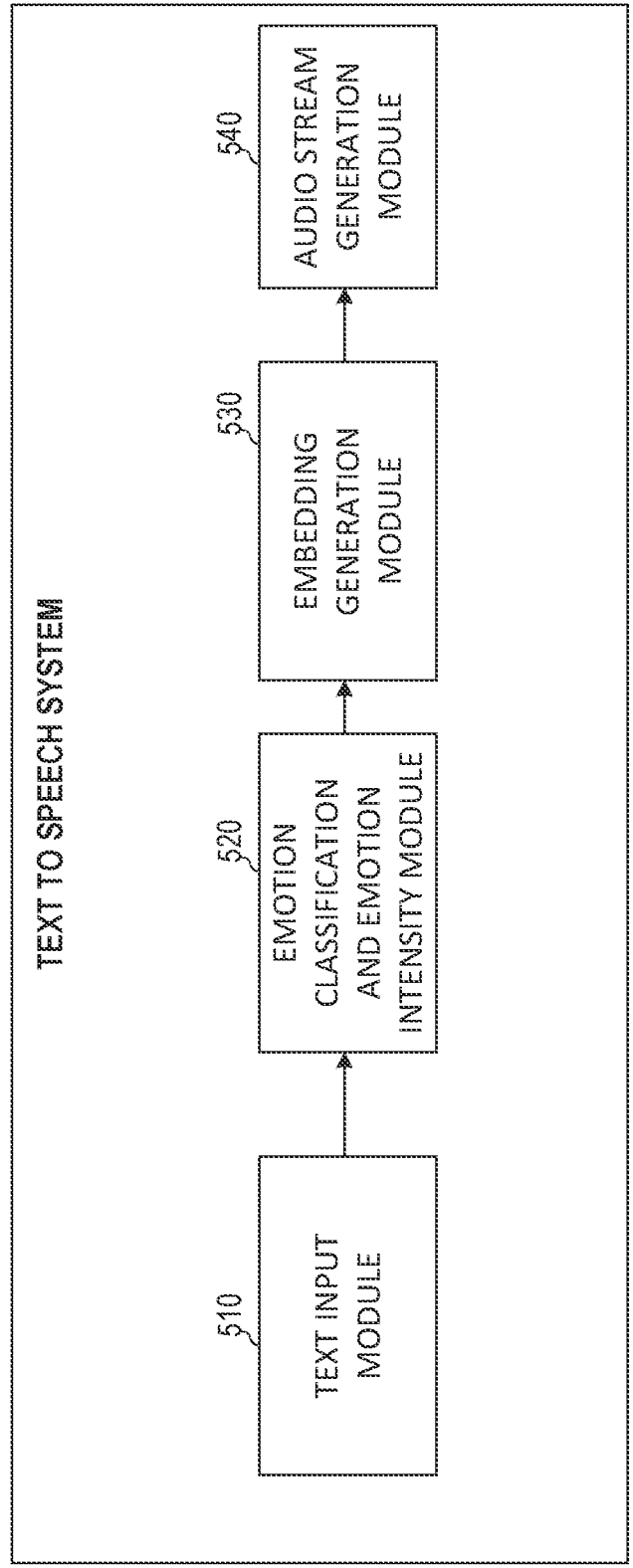
FIG. 5 illustrates the text to speech system, in accordance with some examples.

Further details of the text to speech system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Training data 307 stores a plurality of embeddings for a plurality of speakers. A first embedding of the plurality of embeddings for a first speaker of the plurality of speakers is associated with a first emotion, and a second embedding of the plurality of embeddings for a second speaker of the plurality of speakers is associated with a second emotion. The training data 307 can include a plurality of training text strings, each of the plurality of training text strings being associated with a ground-truth style component representing a combination of scaled style components. The training data 307 is processed by the text to speech system 230 to train the text to speech system 230 in an end-to-end manner to generate a new embedding for a given speaker and/or to compute coefficients or scaling factors for style components of a particular speaker to correspond to a level of emotion.

Data Communications Architecture

Figure 4:
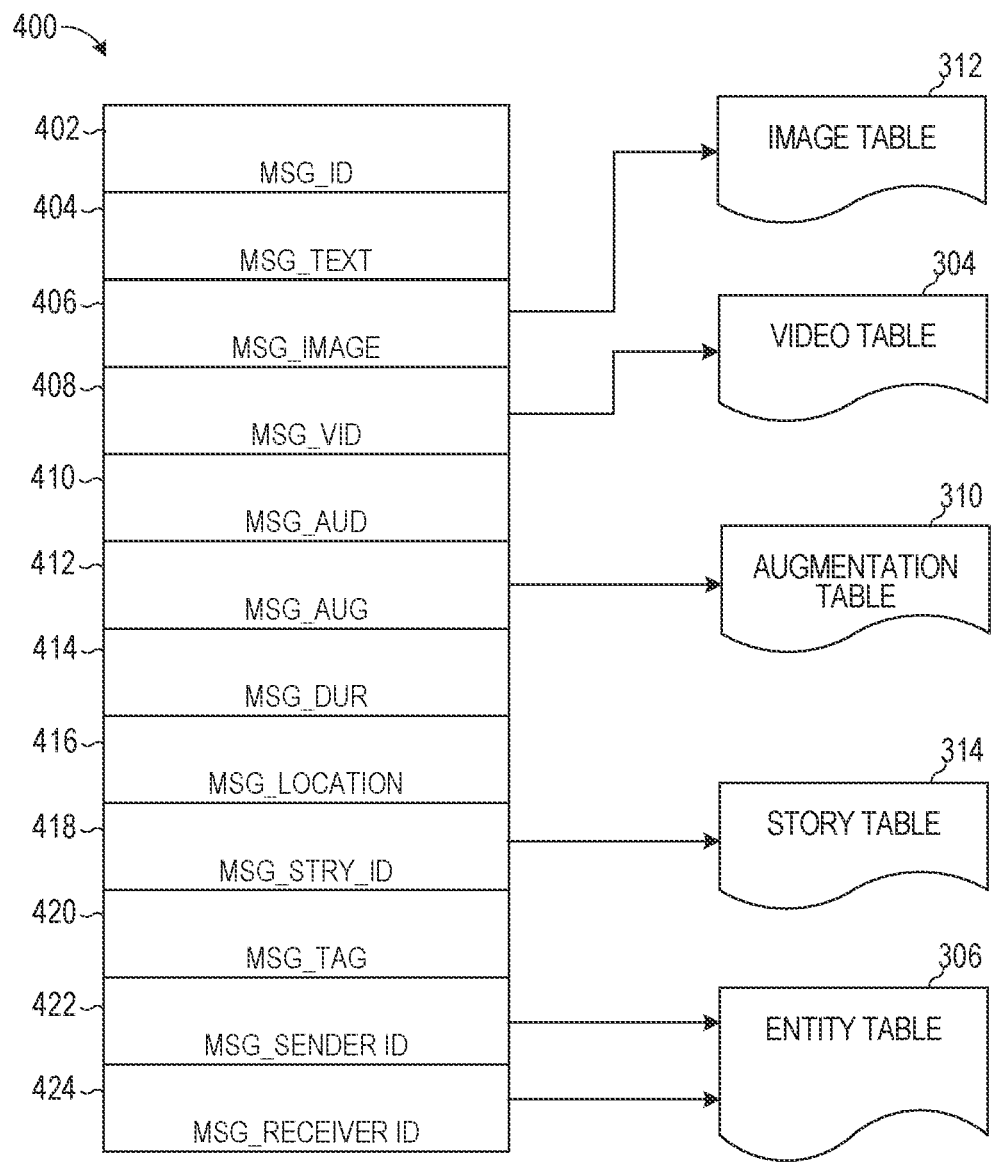
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Text to Speech System

FIG. 5 illustrates the text to speech system 230 according to some examples. The text to speech system 230 includes a text input module 510, an emotion classification module 520, an embedding generation module 530, and an audio stream generation module 540. While all of the components are drawn as being part of the text to speech system 230, any one or all of the components can be implemented by separate devices and be in geographically disparate locations.

The text input module 510 can receive a text string that includes one or more words. For example, the text input module 510 can present a graphical user interface to a user that allows the user to create an image or video. The text input module 510 can then receive input from a user that types in one or more words. The text input module 510 can generate a text string that includes the one or more words typed in by the user. In some examples, the text input module 510 can also receive input from the user that selects a speaker and/or an emotion for the text string. The text input module 510 can receive a request from the user to have the selected speaker speak the one or more words of the text string during playback of the video or display of the image.

In some examples, the text input module 510 can receive input from the user composing a text message for transmission to another user in a communication session. The text input module 510 can receive input from the user that selects the speaker and a request to have an audio message generated in which the selected speaker speaks the words of the text message. After generating the audio message, the audio message can be sent to the other user for playback.

In some examples, the text input module 510 can receive input from the user requesting that audio spoken by the system (versus the user themselves) be added as an audio component of a media asset or message. In these cases, the text input module 510 receives a text string and a selected voice and/or style that will be used to generate the virtual speech. composing a text message for transmission to another user in a communication session.

In some examples, an augmented reality experience can be provided. The augmented reality experience can be created by a creator. The creator of the augmented reality experience can input one or more words for display to a consumer when the augmented reality experience is launched. The creator can input a request to have the one or more words spoken by a specified speaker with a specified emotion when the augmented reality experience is launched. For example, the creator can specify one or more audio instructions, one or more recommendations, or other information for the augmented reality experience by inputting a text string and requesting that the text string be stored as an audio file spoken by a given speaker with a given emotion for playback during presentation of the augmented reality experience.

In some examples, the augmented reality experience can include an option to enter or input one or more words. In response to receiving a selection of the option while the augmented reality experience is presented to the user, the text input module 510 can receive input from the user that provides one or more words of the text string. The one or more words input by the user can include one or more audio instructions, one or more recommendations, or other information for the augmented reality experience. While or after the words are input, the text to speech system 230 generates an audio stream in which the one or more words of the text string are spoken by the specified speaker in the augmented reality experience.

In some examples, the emotion classification and emotion intensity module 520 presents a graphical user interface to a user. The graphical user interface lists a plurality of different emotions. The emotion classification and emotion intensity module 520 can receive input from the user that selects a given emotion from the list of different emotions. The emotion classification and emotion intensity module 520 can receive input that selects different emotions for different sets or groups of words in the text string. The emotion classification and emotion intensity module 520 associates the selected emotion with the corresponding words of the text string.

In some examples, the emotion classification and emotion intensity module 520 can include a machine learning technique that is trained to process one or more words of a text string and identify or associate an emotion with each of the one or more words. For example, the emotion classification and emotion intensity module 520 can include a database of different words or combinations of words and respective emotions. In response to detecting or determining that the one or more words of the text string match or correspond to a given combination of words in the database, the emotion classification and emotion intensity module 520 retrieves the emotion associated with the combination of the of the words stored in the database. The emotion classification and emotion intensity module 520 associates the retrieved emotion with the corresponding words of the text string.

In some examples, the emotion classification and emotion intensity module 520 can include a machine learning technique that is trained to process one or more words of a text string and identify or associate a level or intensity of an emotion with each of the one or more words. For example, the emotion classification and emotion intensity module 520 can include a machine learning technique that processes different combinations of words in a sentence or a text string. The emotion classification and emotion intensity module 520 can then associate different levels of the emotions with different groups or sets of words in the text string. For example, the emotion classification and emotion intensity module 520 can determine that a first combination of words is associated with a first level of a first emotion (e.g., level 5 out of 10 happy emotion) and a second combination of words is associated with a second level of a second emotion (e.g., level 9 out of 10 scared emotion).

The emotion classification and emotion intensity module 520 provides the text string, the selected speaker, the emotion and/or the corresponding level of each emotion of the words of the text string to the embedding generation module 530. The embedding generation module 530 stores one or more machine learning techniques that are trained to generate an embedding for the selected speaker corresponding to the emotion received from the emotion classification module 520. The embedding generated by the embedding generation module 530 is provided to the audio stream generation module 540.

The audio stream generation module 540 applies an acoustic generator and a vocoder (or other neural networks) to the text string and the embedding to generate an audio stream in which the speaker (associated with the embedding) speaks the words of the text string with the emotion or level of emotions provided by the emotion classification module 520. For example, the audio stream generation module 540 normalizes the text as an input for the acoustic generator (e.g., a neural network). which generate a Mel spectrogram for the words of the text string, such as by mapping the embedding vectors provided by the embedding generation module 530 and translating the Mel spectrogram into an audio stream, such as using vocoder (e.g., a neural network). The audio stream can then be played back during display of the image, video, message in a communication session, and/or augmented reality experience. In this way, the words of the text string can be spoken by any specified speaker with any specified emotion, such as neutral, joy, sad, anger, sleepy, disgust, surprise, fear, or any combination thereof, even if the particular emotion is not available for the specified speaker's embeddings.

Figure 6:
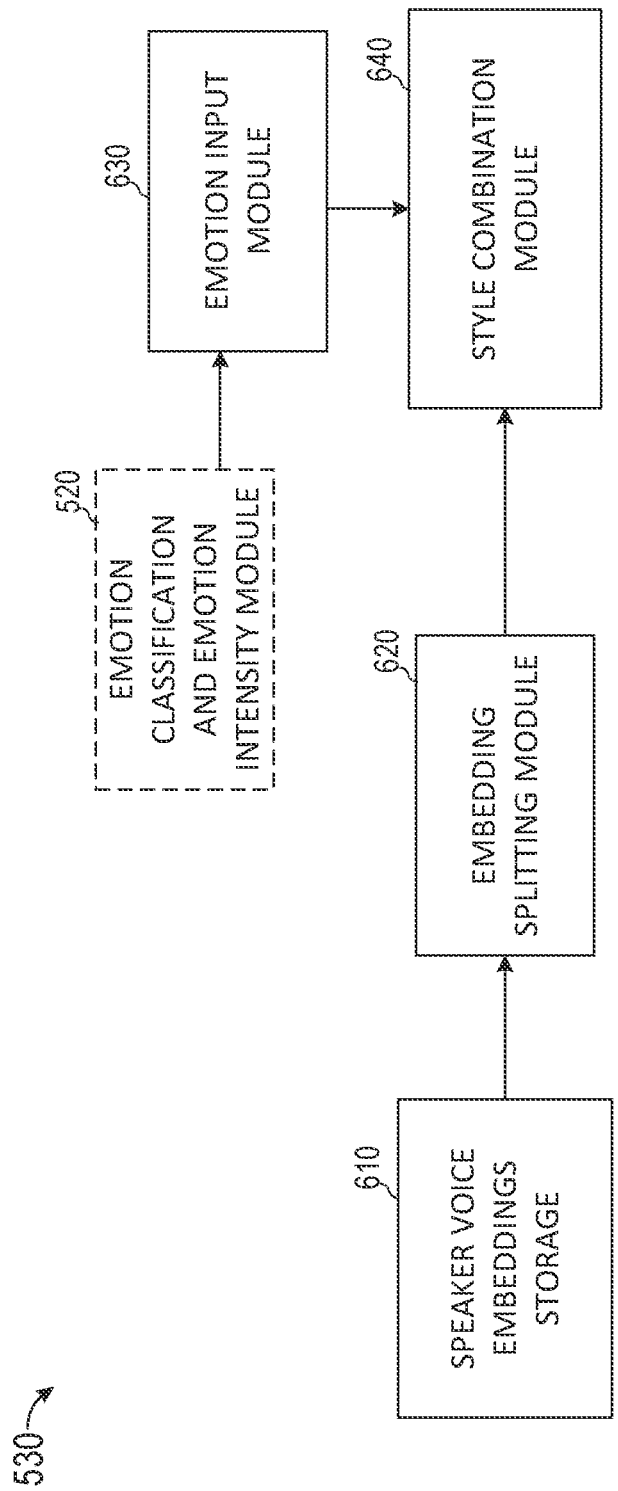
FIG. 6 illustrates the embedding generation module, in accordance with some examples.

FIG. 6 illustrates an example implementation of the embedding generation module 530, in accordance with some examples. The embedding generation module 530 includes a speaker voice embeddings storage 610, an embedding splitting module 620, a style combination module 640, and an emotion input module 630. The speaker voice embeddings storage 610 includes a plurality of embeddings associated with a plurality of speakers. The plurality of embeddings can include a first set of vectors of voice components of a first speaker corresponding to a first set of emotions and a second set of vectors of voice components of a second speaker corresponding to a second set of emotions. The second set of emotions can include some of the same emotions as the first set of emotions. Namely, a first speaker's voice can be encoded into a first set of vectors corresponding to happy emotion speech and sad emotion speech. A second speaker's voice can be encoded into a second set of vectors corresponding to happy emotion speech and neutral emotion speech.

The embedding splitting module 620 includes a trained machine learning technique that receives one or more embeddings and splits the embeddings into multiple components, such as a voice component and a style component. The style component can represent a given emotion of the embedding. The embedding splitting module 620 can identify an identical emotion that is associated with a plurality of embeddings of different speakers. In such cases, the embedding splitting module 620 can obtain the style components of the identical emotion that is associated with the plurality of embeddings to generate a generalized style component for the identical emotion. For example, the embedding splitting module 620 can determine that speaker A and speaker B both have embeddings stored that are associated with a sad emotion. The embedding splitting module 620 can obtain the style component from the sad emotion embedding of speaker A and the style component from the sad emotion embedding of speaker B. The embedding splitting module 620 can then generate a generalized sad emotion style embedding for the style components of the sad emotion embeddings. The generalized sad emotion style embedding can be used to provide the style component for another speaker for which the sad emotion embedding is not available.

In some examples, the embedding splitting module 620 provides the generalized sad emotion style embedding to the style combination module 640. The style combination module 640 can determine that a received emotion (e.g., a sad emotion received from the emotion classification and emotion intensity module 520 via the emotion input module 630) is not available for a given speaker (e.g., speaker C) provided by the text input module 510. In such cases, the style combination module 640 obtains the voice component of the given speaker from the embedding splitting module 620. The style combination module 640 obtains the generalized emotion style of the received emotion (e.g., the generalized sad emotion style embedding). The style combination module 640 generates a new embedding for the given speaker by combining (e.g., concatenating) the voice component of the given speaker with the generalized sad emotion style embedding component. The new embedding allows the audio stream generation module 540 to provide an audio stream in which the given speaker speaks words of the text string in the received emotion. This allows a user to select any speaker from a list of speakers and any emotion. Even if an embedding is not available for the selected speaker in the selected emotion, the text to speech system 230 can generate a new embedding based on the emotion embeddings of other speakers to have the selected speaker speak the words of the text string in the selected emotion.

In some examples, the emotion input module 630 presents a graphical user interface to a user. The graphical user interface lists a plurality of different emotions. The emotion input module 630 can receive input from the user that selects a particular emotion. In such cases, the emotion input module 630 provides the selected emotion to the style combination module 640. The style combination module 640 determines whether the embeddings for the given speaker (selected by the user) are associated with the selected particular emotion. If not, the style combination module 640 identifies a second speaker for which the selected particular emotion is available in the embeddings for the second speaker. The style combination module 640 obtains the style component of the split embeddings of the second speaker and combines the obtained style component (of the second speaker's embeddings) with the voice component of the embedding of the given speaker. This results in an embedding that never before existed for the given speaker that associates the voice of the given speaker with the selected particular emotion using the style component of a different speaker.

In some examples, the emotion input module 630 receives an intensity or level of one or more emotions from the emotion classification module 520. In some examples, the graphical user interface allows a user to input an intensity or level for the selected particular emotion. The emotion can be a mix of different emotions, such as 50% sad (level 5 sad emotion) and 50% angry (level 5 angry emotion).

The emotion input module 630 can implement a machine learning technique that automatically estimates coefficients of style components or scaling factors of style components to provide the mix of different emotions or levels or intensities of a given emotion. The coefficients or scaling factors can be used by the style combination module 640 to linearly interpolate between different styles to generate the style component associated with the indicated level or intensity or mix of different styles. For example, the style combination module 640 can generate a new style component by combining multiple style components of different emotions. For example, the style combination module 640 can scale or apply a first coefficient corresponding to a first level to a first style component corresponding to a first emotion. The style combination module 640 can scale or apply a second coefficient corresponding to a second level to a second style component corresponding to a second emotion. The style combination module 640 can aggregate or interpolate between the scaled first and second style components (adjusted vector values of the different style components) to generate a new vector corresponding to the new style component representing the intensity or level of emotion specified by the emotion input module 630.

In some examples, the emotion input module 630 can implement a machine learning model or technique that is trained (e.g., including one or more neural networks) based on a plurality of training data (including various training text strings, each of the plurality of training text strings being associated with a ground-truth style component representing a combination of scaled style components). The emotion input module 630 is trained to establish a relationship between a ground-truth style component (e.g., a particular level or intensity of emotion or combination of different quantities of emotions) with the scaled style components (e.g., coefficients or scaling factors of each different style component. Based on the established relationship, the emotion input module 630 can predict or estimate the coefficients or scaling factors to apply to different style components to generate a given style component for an emotion with a specified level or intensity.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naïve-Bayes, Random Forest (RF), neural networks (NN), matrix factorization, and Support Vector Machines (SVM) tools may be used for estimating intent and/or entities based on speech input.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes.

Once the training data are collected and processed, the emotion input module 630 can be built using either statistical learning or machine learning techniques. In one embodiment, regression analysis can be used to build the emotion input module 630. Regression analysis is a statistical process for estimating the relationships among variables. There are a number of known methods to perform regression analysis. Linear regression or ordinary least squares regression, among others, are "parametric" in that the regression function is defined in terms of a finite number of unknown model parameters that can be estimated from training data. For example, a regression model (e.g., Equation 1) can be defined, for example, as:

$$H \approx f(X, \beta), \quad \text{(Equation 1)}$$

where "H" denotes the known scaled style components, "X" denotes a vector of input variables (e.g., a specified mix of emotions or level or intensity of a given emotion), and "β" denotes a vector of unknown parameters to be determined or trained for the regression model.

The training data that include pairs of batches of emotion levels and/or mix of emotions and corresponding ground-truth style components (scaled style components of different emotions or style components of embeddings associated with different emotions) provide a set of known H values having corresponding X values (e.g., the emotion levels and/or mix of emotions). Using these data, the model parameter β can be computed using data fitting techniques such as least squares, maximum likelihood, or the like. Once β is estimated, the model can then compute H (e.g., scaled style components of different emotions or style components of embeddings associated with different emotions) for a new set of X values (e.g., emotion levels and/or mix of emotions).

In some examples, a first machine learning technique is trained to synthesize or generate virtual speech in which a given speaker speaks words of a text string with a given style. In such cases, the training data includes pairs of text strings, voice (embedding) and style and corresponding ground truth audio of the speaker. The first machine learning technique can process a first set of training data in which words of a training text string are used to generate an audio file based on the voice and style of the first set of training data. The first machine learning technique can then compare the generated audio file to the ground truth audio file associated with the first set of training data to compute a deviation. Loss is computed based on the deviation and used to update parameters of the first machine leaning technique. Then, another set of training data is retrieved and used to further train or update parameters of the first machine learning technique.

In some examples, a second machine learning technique is trained to compute an emotion and intensity level for a given text string. In such cases, the training data includes pairs of text strings, and the corresponding ground truth emotion and/or intensity. The second machine learning technique can process a first set of training data in which words of a training text string are used to generate an estimated emotion and/or intensity level of the emotion of the words in the text string. The second machine learning technique can then compare the generated emotion and/or intensity level of the emotion to the ground truth emotion and/or intensity level of the emotion associated with the first set of training data to compute a deviation. Loss is computed based on the deviation and used to update parameters of the second machine leaning technique. Then, another set of training data is retrieved and used to further train or update parameters of the second machine learning technique.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data.

In some examples, the machine learning technique is trained by processing a first training text string to generate an estimated set of coefficients associated with a set of different styles. In some examples, the machine learning technique is trained by processing a first mix of emotions or intensity level of a particular emotion to generate the estimated set of coefficients associated with a set of mix of emotions or intensity level of the particular emotion. The machine learning technique combines the set of different styles based on the estimated set of coefficients to generate an estimated style component. For example, the machine learning technique can linearly interpolate a plurality of different style components based on the estimated set of coefficients to generate the estimated style component corresponding to the first mix of emotions or intensity level of the particular emotion.

As another example, the machine learning technique can apply the estimated set of coefficients respectively to style components of different styles to generate the estimated style component corresponding to the first mix of emotions or intensity level of the particular emotion. The machine learning technique can then obtain the ground-truth style component of the first training text string or the first mix of emotions or intensity level of a particular emotion. The machine learning technique compares the estimated style component to the ground-truth style component to generate a loss. Parameters of the machine learning technique are then updated based on the loss. The loss if compared to a threshold, and if the loss satisfies a threshold value or if a stopping criterion is met, the machine learning technique is stored as emotion input module 630 to operate on new data, and training is stopped. Otherwise, the machine learning technique accesses a second training data set (e.g., a second training text string corresponding to the same or different set of different styles as the first training text string or corresponding to the same or different mix of emotions or intensity level of a particular emotion). The machine learning technique again processes the second training data set to predict or estimate the set of coefficients for generation of the estimated style component and comparison with the ground-truth style component of the second training data set. A loss is again computed and used to update parameters of the machine learning technique. The process repeats until a stopping criterion is met.

After being trained, the machine learning technique is provided as the emotion input module 630 and applied to a new, never before seen, emotion intensity or mix of emotions. In one example, the coefficient values of the machine learning technique (e.g., the linear model) are stored in a storage of the emotion input module 630. The emotion input module 630 is configured to receive a new mix of emotions or an emotion with a given level or intensity and generate the coefficients or scaling factors of a style component for an embedding for the new mix of emotions or an emotion with a given level or intensity.

Figure 7:
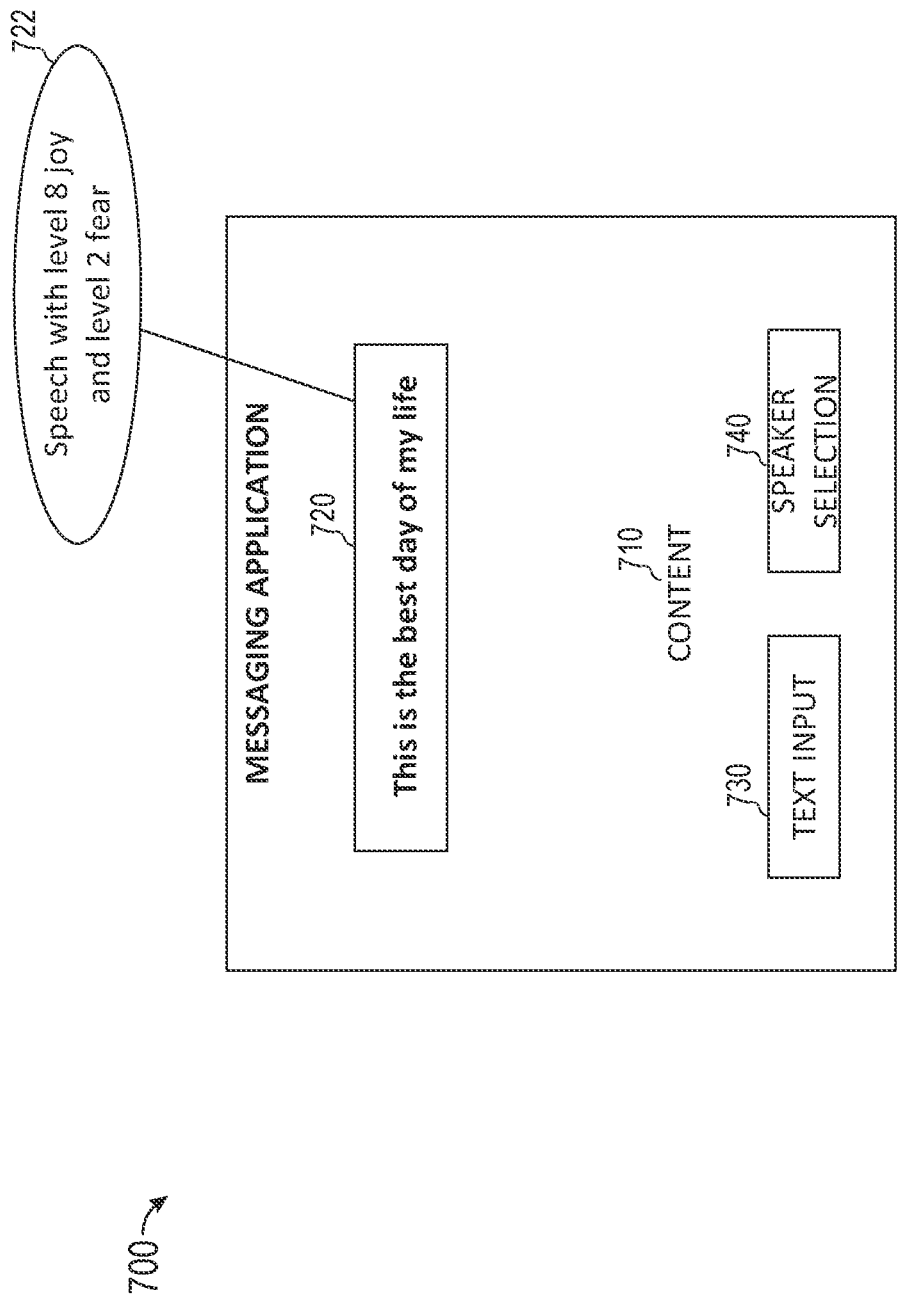
FIG. 7 is an example user interface incorporating the text to speech system, in accordance with some examples.

FIG. 7 is an example user interface 700 incorporating the text to speech system 230, in accordance with some examples. As shown, the graphical user interface 700 can be provided by a messaging application. The graphical user interface 700 can present a text region 720 corresponding to a text string received from a user or creator of an augmented reality experience. The graphical user interface 700 can present the text region 720 over content 710 (e.g., an image or video).

The graphical user interface 700 can receive input that selects a text input option 730. In response, the graphical user interface 700 allows the user to modify or add more text to the text region 720. The graphical user interface 700 displays a speaker selection option 740. In response to receiving a user selection of the speaker selection option 740, the graphical user interface 700 presents a list of available speakers (speakers for which one or more embeddings associated with different emotions are stored and available). The text to speech system 230 processes the words of the text region 720 (e.g., as the words are input or after a command to process is received). The text to speech system 230 determines an emotion associated with the words (e.g., by way of an emotion selected by the user responsive to selection of the speaker selection option 740 or by automatically computing an intensity or level of emotion for one or more words in the text region 720). In some examples, the graphical user interface 700 can include an automatic mode option. In response to receiving input that selects the automatic mode option, the text to speech system 230 processes words of the text string and automatically determines or selects a particular voice with an automatically determined emotion and/or level of emotion.

The text to speech system 230 generates a new embedding for a speaker in response to determining that the currently stored embeddings for the selected speaker fail to include the determined emotion. The text to speech system 230 applies the new embedding to the words in the text region 720 to render or generate an audio stream 722 in which the selected speaker audibly (verbally) speaks the words in the text region 720 with the determined emotion (e.g., a level 8 joy and a level 2 fear).

Figure 8:
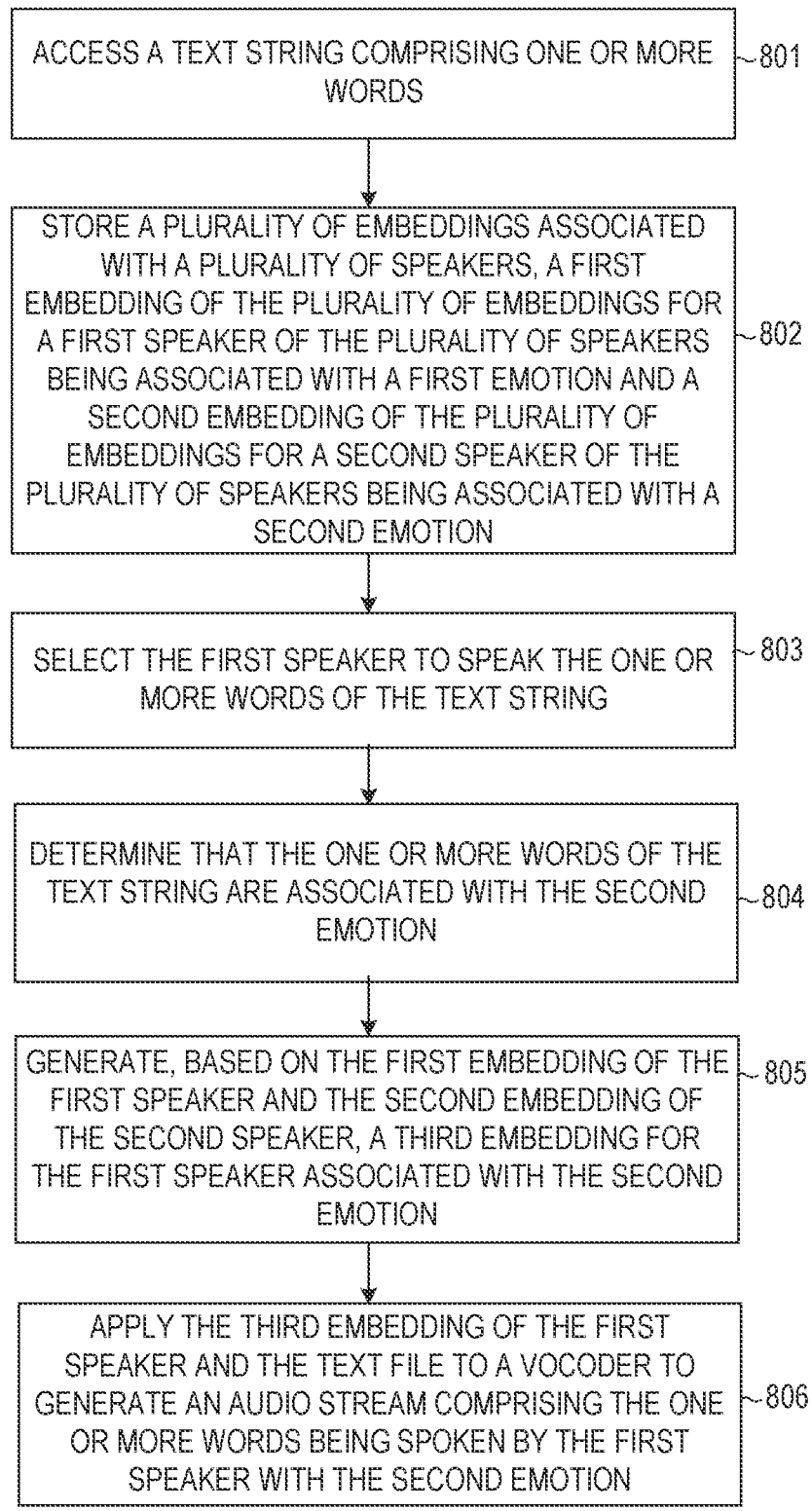
FIG. 8 is a flowchart illustrating example operations of the text to speech system, according to example examples.

FIG. 8 is a flowchart illustrating example operations of the messaging client 104 in performing process 800, according to example examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the text to speech system 230 accesses a text string comprising one or more words, as discussed above.

At operation 802, the text to speech system 230 stores a plurality of embeddings associated with a plurality of speakers, a first embedding of the plurality of embeddings for a first speaker of the plurality of speakers being associated with a first emotion and a second embedding of the plurality of embeddings for a second speaker of the plurality of speakers being associated with a second emotion, as discussed above.

At operation 803, the text to speech system 230 selects the first speaker to speak the one or more words of the text string, as discussed above.

At operation 804, the text to speech system 230 determines that the one or more words of the text string are associated with the second emotion, as discussed above. For example, the text to speech system 230 can receive input that specifies the second emotion, can automatically determine the second emotion by processing the one or more words of the text string, and/or can compute a level of the second emotion by processing the one or more words of the text string.

At operation 805, the text to speech system 230 generates, based on the first embedding of the first speaker and the second embedding of the second speaker, a third embedding for the first speaker associated with the second emotion, as discussed above.

At operation 806, the text to speech system 230 applies the third embedding of the first speaker and the text string to a vocoder to generate an audio stream comprising the one or more words being spoken by the first speaker with the second emotion, as discussed above.

Machine Architecture

Figure 9:
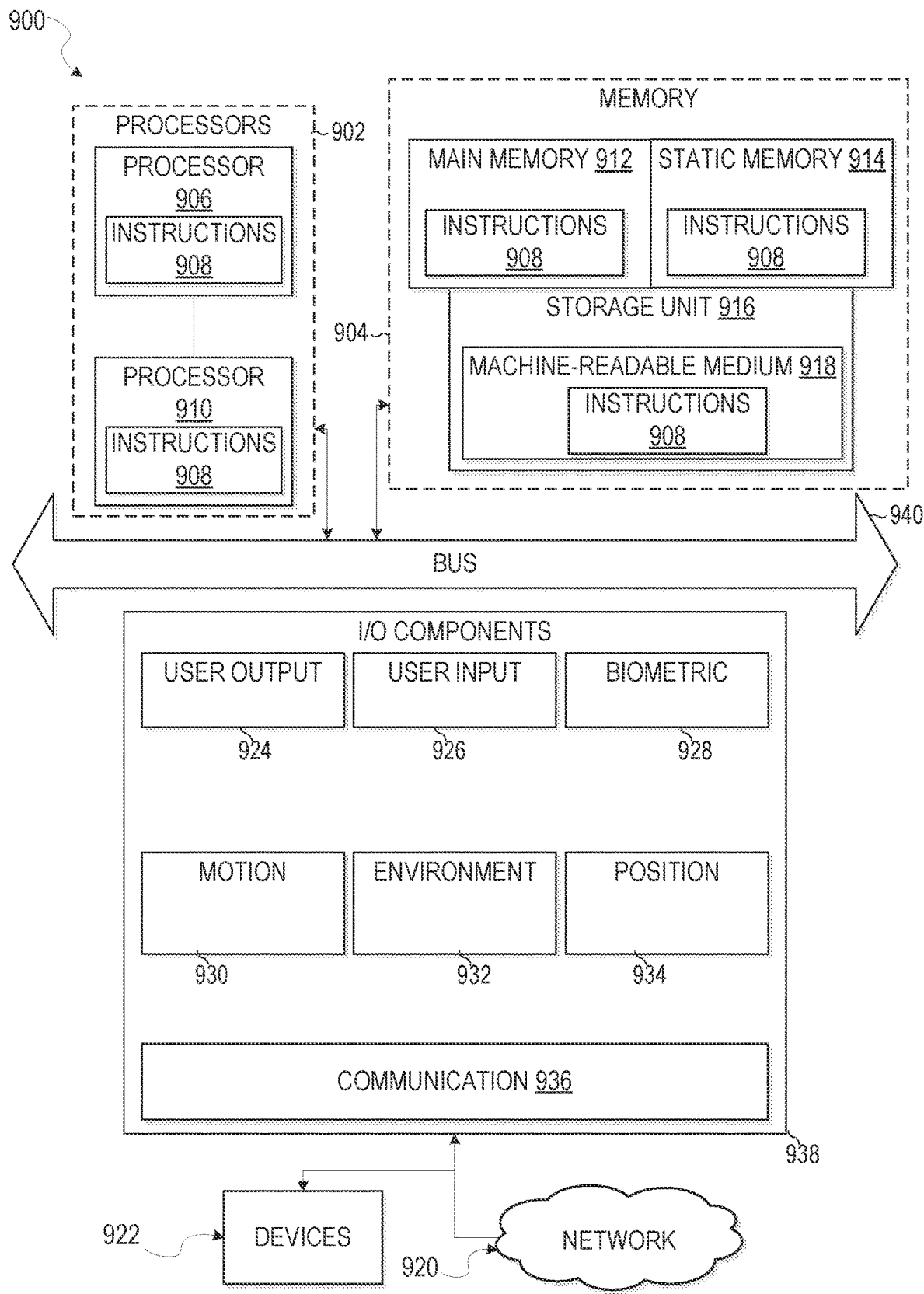
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple camera systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
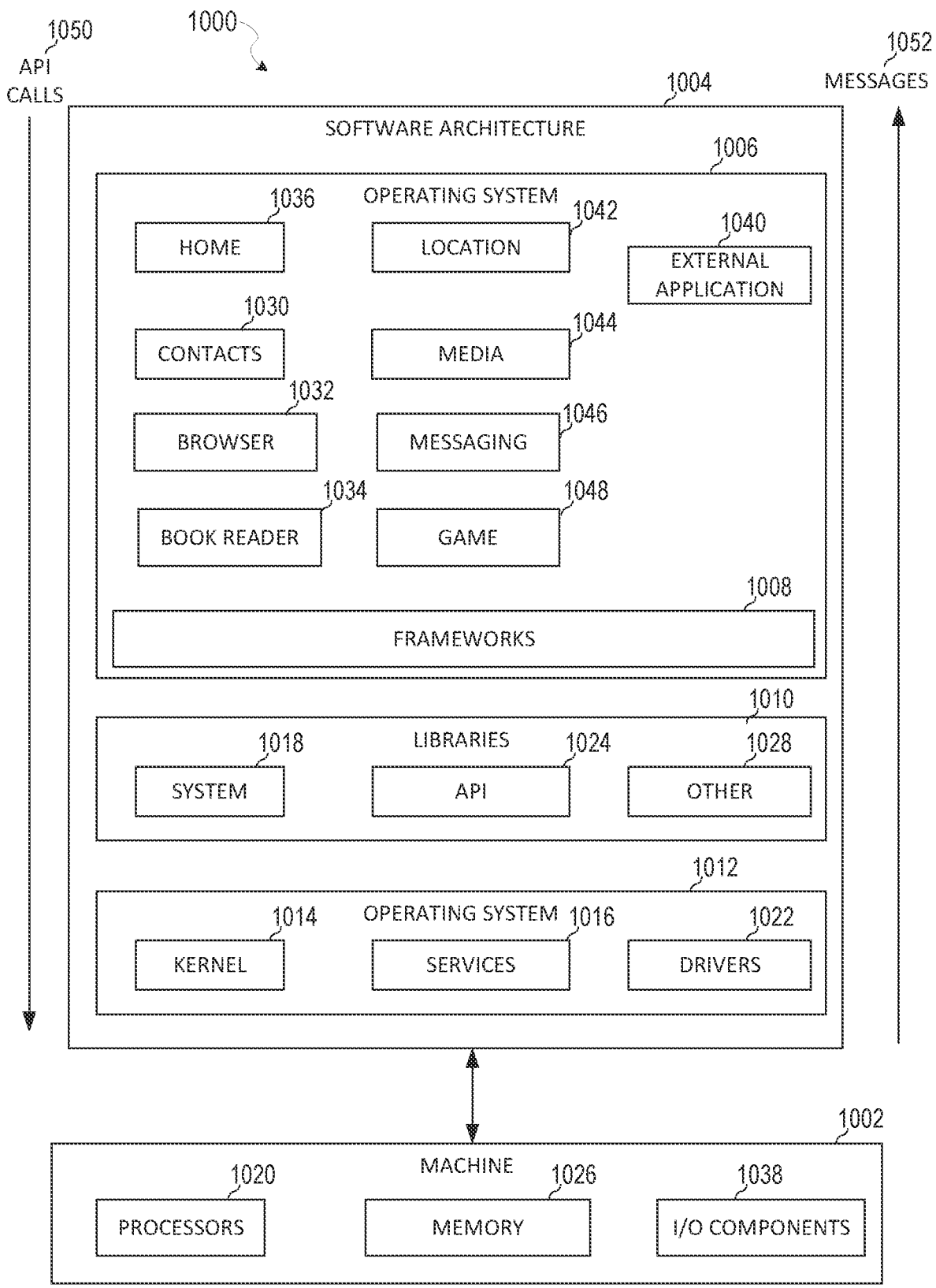
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks, and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   storing a first embedding for a first speaker of a plurality of speakers and a second embedding for a second speaker of the plurality of speakers, the first embedding being associated with a first emotion and the second embedding being associated with a second emotion;
   selecting, by one or more processors, the first speaker for virtual speech of one or more words of a text string;
   generating, based on the first embedding of the first speaker and the second embedding of the second speaker, a third embedding for the first speaker associated with the second emotion; and
   applying the third embedding of the first speaker and the text string to a vocoder to generate an audio stream comprising the one or more words being virtually spoken by the first speaker with the second emotion.

2. The method of claim 1, wherein the vocoder comprises a trained neural network configured to translate speech of a given speaker in a Mel spectrogram format to an acoustic audio stream, and wherein the third embedding is generated responsive to determining that the one or more words are associated with the second emotion.

3. The method of claim 1, further comprising:
   splitting the first embedding for the first speaker into a first voice component and a first style component; and
   splitting the second embedding for the second speaker into a second voice component and a second style component.

4. The method of claim 3, wherein generating the third embedding comprises:
   combining the second style component split from the second embedding and the first voice component split from the first embedding into a third embedding, the third embedding comprising the first voice component and the second style component.

5. The method of claim 3, further comprising:
   processing first speech associated with the first speaker by a machine learning technique to estimate the first voice component and the first style component; and
   processing second speech associated with the second speaker by the machine learning technique to estimate the second voice component and the second style component.

6. The method of claim 5, wherein generating the third embedding comprises:
   training the machine learning technique to generalize the second style component by processing a plurality of speech associated with a plurality of speakers associated with the second style component; and
   combining the generalized second style component into the third embedding, the third embedding comprising the first voice component and the generalized second style component.

7. The method of claim 1, further comprising:
   displaying a list of the plurality of speakers; and
   receiving input comprising a selection of the first speaker from the plurality of speakers in the displayed list.

8. The method of claim 1, wherein the second emotion comprises at least one of neutral, joy, sad, anger, sleepy, disgust, surprise, or fear.

9. The method of claim 1, further comprising:
   processing the one or more words in the text string using a machine learning technique to predict a level of emotion of the one or more words.

10. The method of claim 9, wherein the machine learning technique comprises a random-forest, a neural network, or a support vector machine, the machine learning technique being trained to predict an intensity of text based on language models.

11. The method of claim 9, further comprising:
    computing a first coefficient associated with the first emotion based on the predicted level of emotion; and
    computing a second coefficient associated with the second emotion based on the predicted level of emotion.

12. The method of claim 11, wherein generating the third embedding comprises:
    scaling a first style component of the first embedding based on the first coefficient;
    scaling a second style component of the second embedding based on the second coefficient; and
    combining the scaled first and second style components into a style component of the third embedding.

13. The method of claim 11, further comprising:
    receiving training data comprising a plurality of training text strings, each of the plurality of training text strings being associated with a ground-truth style component representing a combination of scaled style components;
    processing a first training text string by a machine learning technique to generate an estimated set of coefficients associated with a set of different styles;

combining the set of different styles based on the estimated set of coefficients to generate an estimated style component;
comparing the estimated style component to the ground-truth style component of the first training text string to generate a loss; and
updating parameters of the machine learning technique based on the loss.

14. The method of claim 12, wherein the audio stream comprises the one or more words being spoken by the first speaker with a portion of the first emotion and a portion of the second emotion.

15. The method of claim 1, further comprising:
receiving a video;
receiving a request to associate the text string with the video; and
in response to receiving the request, adding the audio stream comprising the one or more words being spoken by the first speaker with the second emotion to the video.

16. The method of claim 1, further comprising:
receiving an augmented reality experience being associated with an audio instruction, a recommendation, or information; and
associating the audio stream with the augmented reality experience to verbally provide the audio instruction, the recommendation, or the information.

17. The method of claim 16, wherein the audio instruction, the recommendation, or the information is received from a user as the text string in response to launching the augmented reality experience on a messaging application.

18. The method of claim 1, further comprising determining that an embedding for the first speaker and the second emotion is not available, wherein the third embedding is generated in response to determining that the embedding for the first speaker and the second emotion is not available.

19. A system comprising:
at least one processor configured to perform operations comprising:
storing a first embedding for a first speaker of a plurality of speakers and a second embedding for a second speaker of the plurality of speakers, the first embedding being associated with a first emotion and the second embedding being associated with a second emotion;
selecting the first speaker for virtual speech of one or more words of a text string;
generating, based on the first embedding of the first speaker and the second embedding of the second speaker, a third embedding for the first speaker associated with the second emotion; and
applying the third embedding of the first speaker and the text string to a vocoder to generate an audio stream comprising the one or more words being virtually spoken by the first speaker with the second emotion.

20. A non-transitory machine-readable storage medium that includes instructions that, when executed by one or more processors, cause the one or more processors to perform operations comprising:
storing a first embedding for a first speaker of a plurality of speakers and a second embedding for a second speaker of the plurality of speakers, the first embedding being associated with a first emotion and the second embedding being associated with a second emotion;
selecting the first speaker for virtual speech of one or more words of a text string;
generating, based on the first embedding of the first speaker and the second embedding of the second speaker, a third embedding for the first speaker associated with the second emotion; and
applying the third embedding of the first speaker and the text string to a vocoder to generate an audio stream comprising the one or more words being virtually spoken by the first speaker with the second emotion.

* * * * *